United States Patent [19]

Maeda

[11] Patent Number: 4,854,068
[45] Date of Patent: * Aug. 8, 1989

[54] FISHING ROD AND A MANUFACTURING METHOD THEREFOR

[75] Inventor: Yoshimi Maeda, Osaka, Japan

[73] Assignee: Shimano Industrial Company Limited, Osaka, Japan

[ * ] Notice: The portion of the term of this patent subsequent to Jul. 22, 2003 has been disclaimed.

[21] Appl. No.: 144,668

[22] Filed: Jan. 12, 1988

Related U.S. Application Data

[60] Continuation of Ser. No. 835,785, Mar. 3, 1986, abandoned, which is a division of Ser. No. 620,939, Jun. 15, 1984, Pat. No. 4,601,127.

[30] Foreign Application Priority Data

| Jul. 28, 1983 | [JP] | Japan | 58-118137 |
| Nov. 22, 1983 | [JP] | Japan | 58-180823 |
| Nov. 24, 1983 | [JP] | Japan | 58-181846 |
| Dec. 5, 1983 | [JP] | Japan | 58-230434 |
| Dec. 29, 1983 | [JP] | Japan | 58-249850 |
| Apr. 24, 1984 | [JP] | Japan | 59-60241 |

[51] Int. Cl.$^4$ ............................................. A01K 87/00
[52] U.S. Cl. ................................... 43/18.5; 43/23
[58] Field of Search .................... 43/18.5, 18.1, 22, 23

[56] References Cited

U.S. PATENT DOCUMENTS

| D. 108,721 | 3/1938 | Morgan | 43/23 |
| 3,618,253 | 11/1971 | Edwards | 43/23 |
| 4,043,074 | 8/1977 | Airhart | 43/18.5 |
| 4,044,488 | 8/1977 | Ohmura | 43/23 |
| 4,362,418 | 12/1982 | Loomis | 43/18.5 |
| 4,464,856 | 8/1984 | Holden | 43/18.5 |
| 4,468,270 | 8/1984 | Green | 43/18.5 |
| 4,601,127 | 7/1986 | Maeda | 43/18.5 |

*Primary Examiner*—Gene P. Crosby
*Attorney, Agent, or Firm*—Stevens, Davis, Miller & Mosher

[57] ABSTRACT

A fishing rod is provided which is formed of a handle having a fishing reel mounting portion, a grip, and a rod body tapered toward its tip. The larger diameter side of the rod body includes a tubular fitting portion having a tapered portion increasing gradually in diameter at a rate of change larger than that of the rod body. The tubular fitting portion is fitted onto the outer periphery of the handle and is coupled integrally therewith. A manufacturing method is also provided for forming the rod body integrally with the tubular fitting portion.

20 Claims, 5 Drawing Sheets

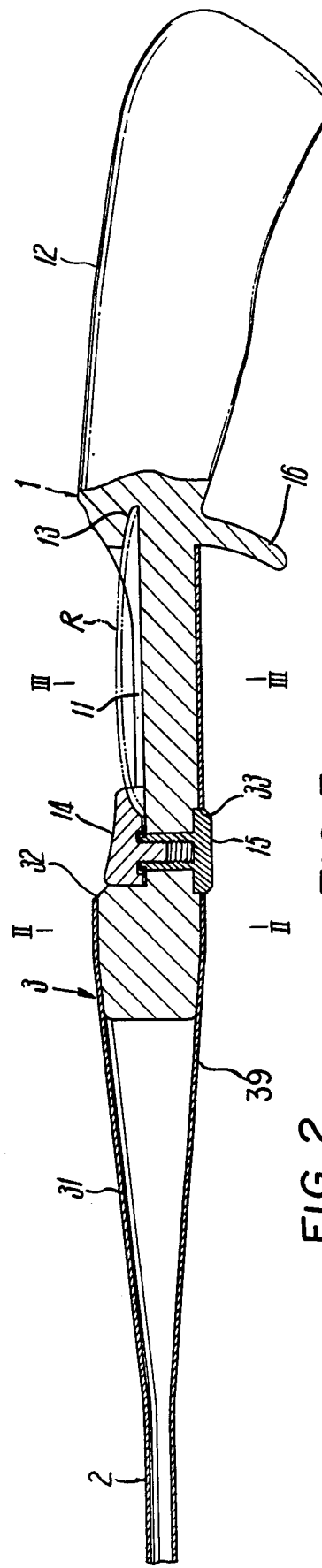
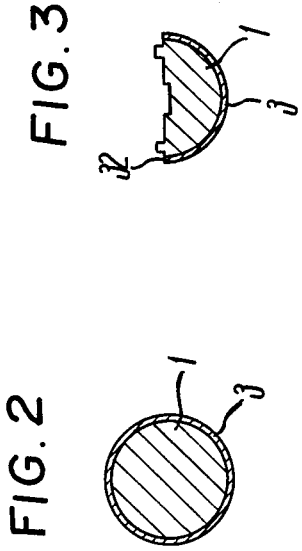
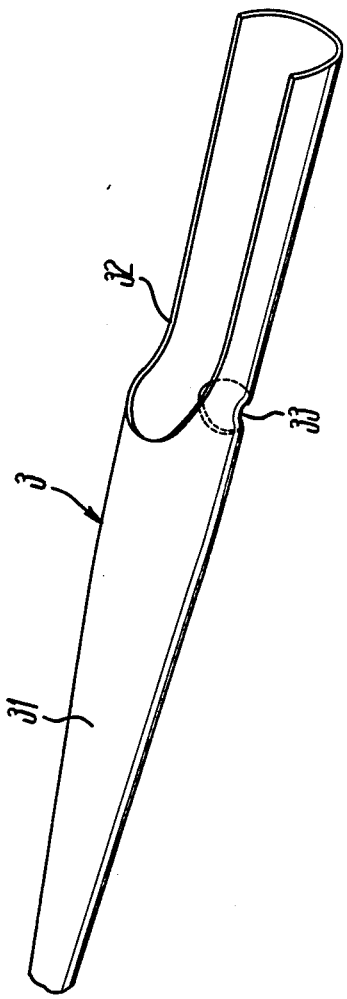

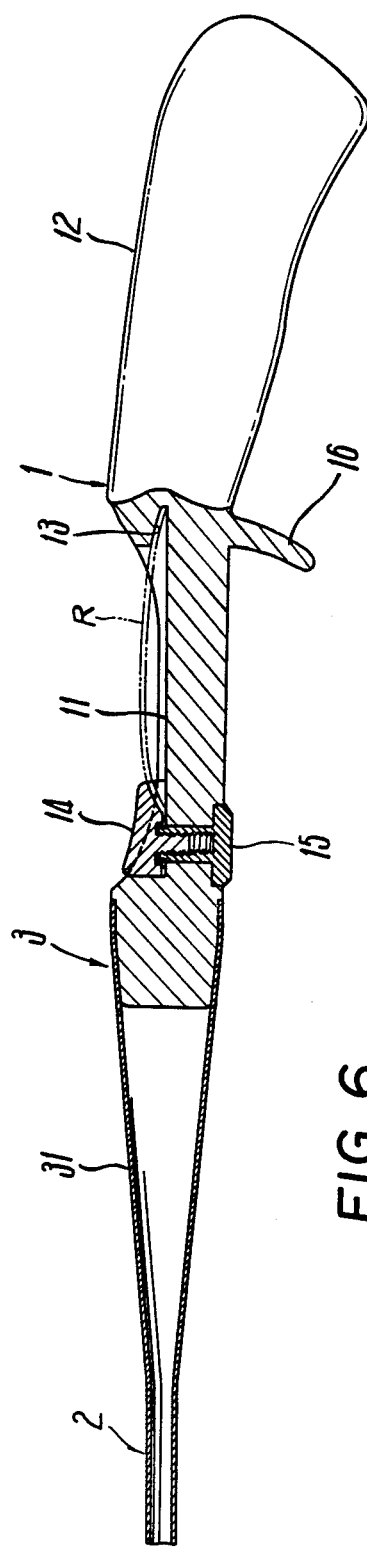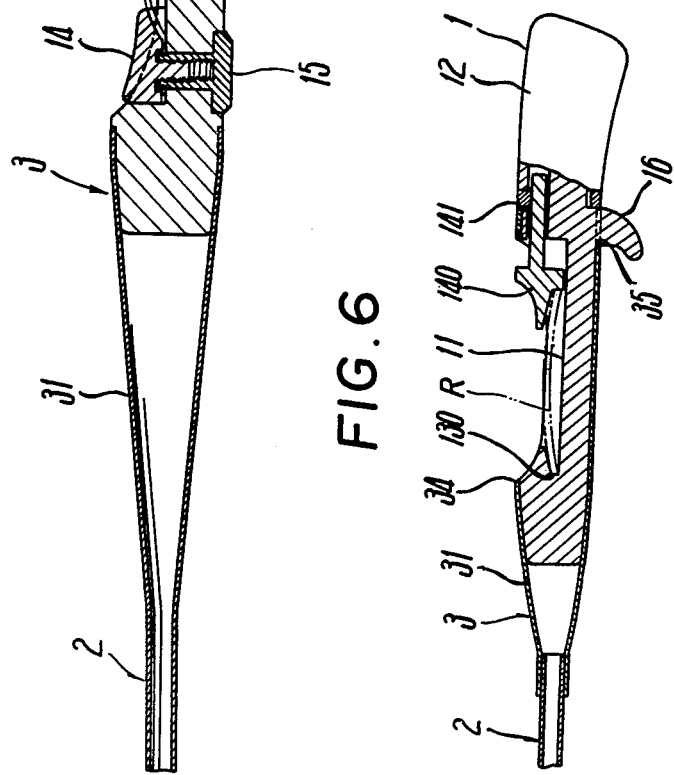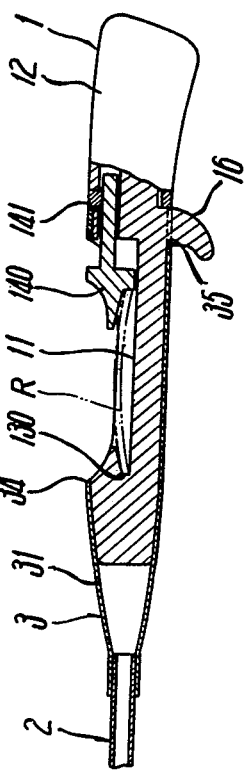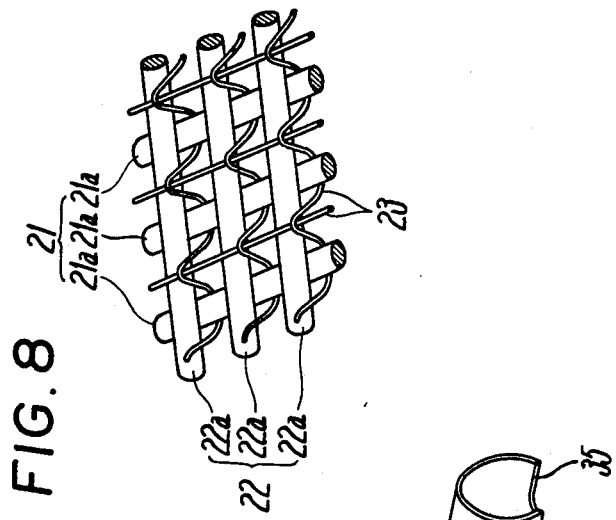

FISHING ROD AND A MANUFACTURING METHOD THEREFOR

This application is a continuation of application Ser. No. 835,785, filed Mar. 3, 1986, now abandoned which in turn is a division of application Ser. No. 620,939, filed June 15, 1984, now U.S. Pat. No. 4,601,127, issued July 22, 1986.

FIELD OF THE INVENTION

This invention relates to a fishing rod and a manufacturing method therefor, and more particularly to a fishing rod comprising a rod body tapered toward the tip and a handle having a reel mounting portion and grip, so that the rod body is adapted to couple at the larger diameter end with the handle.

BACKGROUND OF THE INVENTION

Generally, this kind of fishing rod is provided at the utmost end of the reel mounting portion at the handle with an insertion bore, into which the larger diameter end of the rod body is fitted, thereby coupling the rod body with the handle.

Such conventional construction, however, concentrates stress in the coupling of the rod body with the handle, thereby creating a problem in that the coupling is breakable.

Conventionally, the root end of the rod body is made larger in thickness than other portions and is reinforced to avoid a breakdown of the rod body at the coupling with the handle. Such reinforcement, however, is insufficient because a difference in thickness between the thick reinforced portion and the thin not-reinforced portion at the rod body becomes larger to concentrate stress near the border of both of these portions so that the rod body becomes breakable at the border.

SUMMARY OF THE INVENTION

A main object of the invention is to improve a coupling construction for coupling the larger diameter end of the rod body with the handle to thereby raise rigidity at the root end of the rod body and to avoid concentration of stress thereon, thus preventing a breakdown at the coupling of the rod body with the handle.

Another object of the invention is to provide a novel manufacturing method for the rod body to attain the above-described main object.

The fishing rod of the invention which couples the handle with the rod body, is provided at the larger diameter end of the rod body with a tubular portion to be fitted onto the outer periphery of a reel mounting portion at the handle. The tubular fitting portion is provided with a tapered portion increasing gradually in diameter at a rate of change larger than that of the rod body and is connected in continuation of and integral with the rod body through the tapered portion. Also, the tubular fitting portion is fitted at the larger diameter root end onto the reel mounting portion at the handle to couple the rod therewith. A cutout is provided at the upper portion of a portion to be fitted onto the reel mounting portion to expose the reel mounting portion to the exterior. Such construction makes it possible to transfer the rigidity continuously from the root end of the rod body to the larger diameter portion at the tubular portion, thereby preventing concentration of stress at the root end of the rod body. Hence, a breakdown thereof is avoidable and the durability is remarkably improved.

The rod body is formed of a prepreg sheet of high strength fibre, such as glass, carbon or boron fibre, permeated with synthetic resin, the sheet being wound around a mandrel, heated under pressure, and molded in a hollow shape. The tubular fitting portion is molded integrally with the rod body by use of the aforesaid prepreg sheet therefor, or a separate prepreg or second prepreg sheet of high strength fibre sheet permeated with synthetic resin.

In either case, the rod body and tubular fitting portion are integral and in continuation of each other.

The fishing rod manufacturing method of the invention aims at integral formation of the rod body and tubular fitting portion and includes the following steps: (a) a first prepreg sheet of high strength fibre permeated with synthetic resin is wound around a first mandrel and baked under pressure to previously form a hollow rod body; (b) a fitting member, which has an outer periphery to be fitted into the inner surface of the root end of the rod body formed by the above step and which has a locking means at the outer periphery and is mounted to a second mandrel for molding the tubular fitting portion, the fitting member being fitted onto the root end of the rod body in relation of being not-rotatable relative thereto; and (c) a second prepreg sheet of high strength fibre permeated with synthetic resin is wound around the second mandrel in relation of overlapping part of the prepreg sheet with the outer peripheral surface of the root end of the rod body and is baked under pressure so that the tubular fitting portion is coupled integrally with the rod body.

The manufacturing method of the invention, even when a difference in diameter between the rod body and the tubular fitting portion is large, can prevent the prepreg from twisting during the winding around the mandrel, whereby the tubular fitting portion is formed properly in continuation of the rod body and the border between the rod body and the tubular fitting portion is not reduced in strength.

Also, a bridge member is preferred to be formed to cover a joint between the rod body and the second mandrel so as to bake under pressure the second prepreg, whereby the coupling strength between the rod body and the tubular fitting portion can be increased.

These and other objects of the invention will be seen by reference to the following description, taken in connection with the accompanying drawings.

BRIEF DESCRIPTION OF THE DRAWINGS

FIG. 1 is a partially omitted sectional view of an embodiment of a fishing rod of the invention, FIG. 2 is a sectional view taken on the line II—II in FIG. 1, FIG. 3 is a sectional view taken on the line III—III in FIG. 1, FIG. 4 is a partially omitted perspective view of a tubular fitting portion only, FIGS. 5 and 6 are partially omitted sectional views of modified embodiments of the invention, FIG. 7 is a partially omitted perspective view of only a tubular fitting portion in the FIG. 6 embodiment, FIG. 8 is a perspective enlarged view of a prepreg forming the tubular fitting portion in FIGS. 6 and 7, FIGS. 9 and 10 are partially omitted sectional views of another modified embodiments of the invention, FIG. 11 is a sectional view taken on the line XI—XI in FIG. 10, FIGS. 12 through 15 are illustrations of a manufacturing method for the fishing rod of the invention, in which

DETAILED DESCRIPTION OF THE INVENTION

Figure 9:
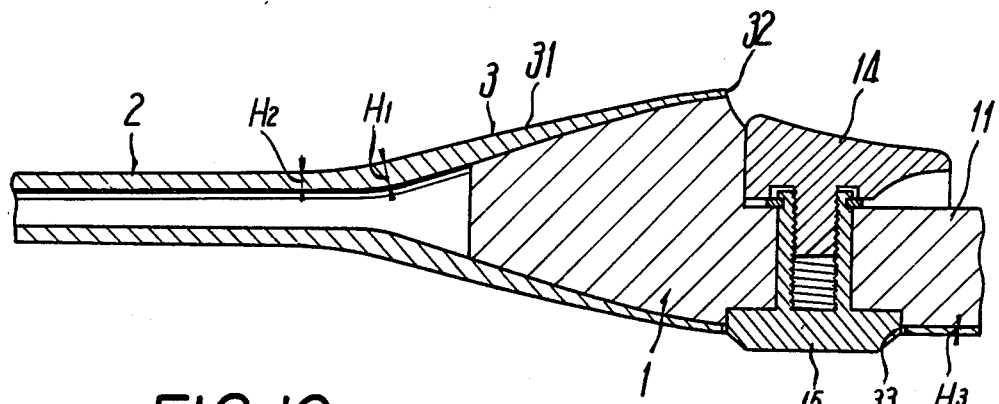

The fishing rod of the invention, as shown in FIG. 1, basically comprises a rod body 2 tapered toward the tip and a handle 1 having a reel mounting portion 11 and a grip 12, the rod body 2 being coupled at the larger diameter end with the handle 1.

This invention is characterized in that at the larger diameter end 2a of rod body 2, a tubular fitting portion 3 having an inner diameter large enough to be fitted onto the outer periphery of reel mounting portion 11 at the handle 1 is provided integrally with the rod body 2 through a tapered portion 31 increasing gradually in diameter at a rate of change larger than that of rod body 2 and being axially long enough to disperse stress acting on the coupling portion with the handle, so that the tubular fitting portion 3 is fitted onto the handle 1 to couple the rod body 2 therewith.

The rod body 2 is formed in such a manner that a yarn sheet or a wooven sheet, of high strength fibre, such as glass fibre or carbon fibre, is permeated with synthetic resin to form prepreg material, which is wound around a mandrel and heated under pressure to be made hollow.

The tubular fitting portion 3 and tapered portion 31 are formed by use of, for example, the prepreg forming the rod body 2. The prepreg is long enough to form the rod body 2 inclussive of tubular fitting portion 3 and tapered portion 31. The prepreg is wound around a mandrel comprising a mold of the size fit for an inner diameter of rod body 2 and fit for the same of tubular fitting portion 3 and tapered portion 31. The prepreg is then heated under pressure to be formed into the rod body 2, tubular fitting portion 3 and tapered portion 31, which are integral with each other and equal in thickness.

Also, the tubular fitting portion 3, as shown in FIG. 1, is made axially long enough to be fitted onto the reel mounting portion 11 from the fore end thereof to the rear end. Tubular fitting portion 3 is provided with a cutout 32 for exposing therethrough the reel mounting portion 11 to the exterior as shown in FIG. 4, and is fitted around the reel mounting portion 11.

The tapered portion 31 as abovementioned increases gradually in diameter at a rate of change and to a longitudinal extent sufficient to avoid concentration of stress.

The reel mounting portion 11 at the handle 1, as shown by the chain line in FIG. 1, is provided with a retaining bore 13 for retaining one end of a mounting leg R at a fishing reel, a pusher 14 for urging the mounting leg R to the reel mounting portion 11, and a control 15 for the pusher 14. Control 15 is rotated to actuate the pusher 14 to thereby fix the mounting leg R to the mounting portion 11. Also, at the tubular fitting portion 3 is provided a through bore 33 for receiving the control 15.

In the above embodiment, the mounting leg R of the reel is fixed to the reel mounting portion 11 and thereafter an angler grips the handle grip 12 to cast a fishing line.

Also, the cutout 32 is provided at an upper half of a portion at the tubular fitting portion 3 corresponding to the reel mounting portion 11 and the rear end thereof is open. Alternatively, the cutout 32 may be formed throughout around the reel mounting portion 11. In this case, the tubular fitting portion 3 is fitted only to the outer periphery at a front end of reel mounting portion 11.

In addition, the construction in FIG. 1 provides increases in the coupling strength of rod body 2 with the handle 1 more than that in FIG. 5.

Alternatively, the cutout may be formed as shown in FIGS. 6 and 7, in which a cutout 34 is not open at the rear, but closes in part. Also, another cutout 35 is provided at a lower portion of the rear end of the tubular fitting portion 3 corresponding to a finger hook 16 at the handle 1.

In the embodiment in FIG. 6, the reel mounting portion 11 is provided at the front with a retaining recess 130 for retaining the reel mounting leg R and at the rear with a pusher 140 slidable longitudinally of the handle 1 and an operating ring 141 screwable with the pusher 140 and rotating to move it longitudinally of the handle 1.

Thus, this embodiment need not provide the through bore 33 in FIG. 1 or 5, whereby, in cooperation with the aforesaid construction of cutout 34, the lowering of strength caused by forming the cutout and through bore is avoided.

The cutouts 32, 34 and 35 are formed mainly by diamond grindstone cutting, in which the cut edges of these cutouts may cause disentanglement of the high strength yarn. In order to solve this problem it is preferable for formation of tubular fitting portion 3 to use prepreg as shown in FIG. 8.

The prepreg shown in FIG. 8 is formed in such a manner that a warp group 21 of high strength fibre yarn 21a and a weft group 22 of high strength yarn 22a are overlapped with each other in the relation that yarns 21a and 22a intersect at right angles each other so that the yarn groups 21 and 22 are tied by weaving threads 23 woven therebetween to thereby form a sheet, which is permeated by synthetic resin.

The yarns 21a and 22a of high strength fibre use glass fibre, carbon fibre or boron fibre, the weaving threads 23 using organic fibre, such as nylon fibre or polyester fibre, or inorganic fibre, such as glass fibre or carbon fibre, which is larger in fracture strength than the yarns 21a and 22a and also smaller in sectional area than the same. In addition, the high strength yarns 21a and 22a are made larger in volume percentage than the weaving threads 23.

The aforesaid prepreg is used to form the tubular fitting portion 3 and the cutouts 32, 34 or 35 are formed thereon, whereby the cut edge of each cutout 32, 34 or 35 can keep the high strength yarns 21a and 22a in an array held by synthetic resin. In addition, the tubular fitting portion may be formed of the prepreg only, but may be formed at the outermost layer only in combination of the prepreg with the second prepreg.

Alternatively, the connecting portion between the rod body 2 and the tubular fitting portion 3, as shown in FIG. 9, may have a thickness $H_1$ larger than that $H_2$ or rod body 2, the thickness $H_1$ adapted to be smaller gradually toward the rear of tubular fitting portion 3.

Such construction can increase the strength at the connecting portion between the tubular fitting portion 3 and the rod body 2, and also an angler can sensitively feel a bit of a hooked fish because he touches a portion of smaller thickness $H_3$ by his hand gripping the handle 1.

Figure 10:
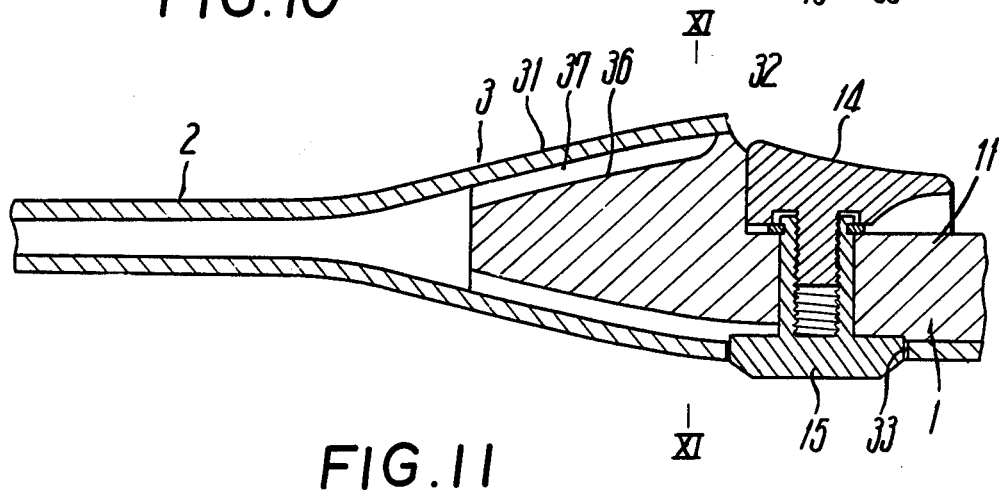
Figure 11:
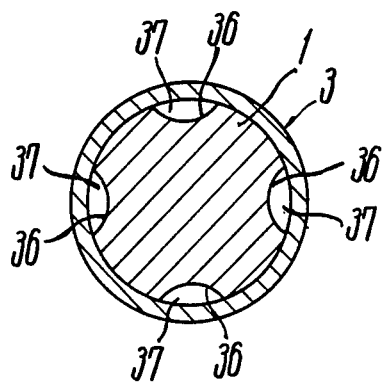

Furthermore, the handle 1 is provided at its portion fitted into the tubular fitting portion 3 with a plurality of recesses 36 as shown in FIGS. 10 and 11 to thereby form cavities 37 between the handle 1 and the tubular fitting portion 3. Hence, the angler can more sensitively catch a bite of a hooked fish through vibrations caused thereby on the tubular portion 3 and transferred effectively to his hand.

Next, explanation will be given on a manufacturing method of a fishing rod comprising the rod body 2 and tubular fitting portion 3 integral therewith.

Generally, prepreg is used for the above purpose, in which when one mandrel is used to form the rod body 2 integral with the tubular portion 3, wrinkles are produced at the connecting portion between the rod body 2 and the tapered portion 31 because a rate of change in diameter of tapered portion 31 is larger than that of rod body 2, thereby creating a problem in deterioration of strength.

Hence, the present invention uses a first prepreg for the rod body 2 and a second prepreg for the tubular fitting portion 3 and separate from the first prepreg. The first prepreg is wound onto a first mandrel to previously form the rod body 2 and then the second prepreg is wound onto a second mandrel to form the tubular fitting portion 3.

Figure 12:
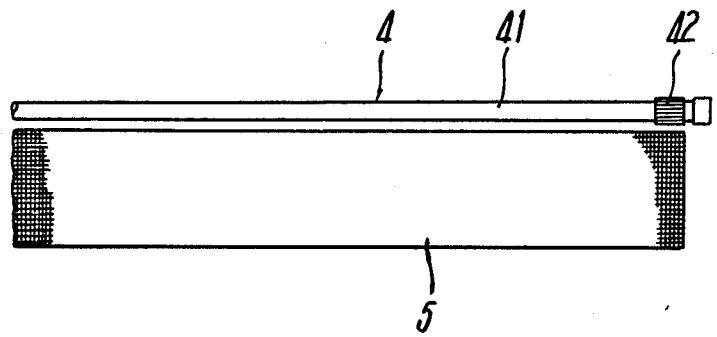
FIG. 12 is an illustration of a molding process for the rod body.
Figure 13:
FIG. 13 is a partially omitted and cutaway front view of the molded rod body.

In detail, referring to FIG. 12, reference numeral 4 designates a first mandrel having a tapered mold 41 of the size corresponding to the hollow tapered rod body 2 and a locking means, such as serrations 42, provided at one end outer periphery of mold 4. The first prepreg 5 of a sheet of high strength fibre, such as carbon or glass fibre, is permeated with synthetic resin and wound several times around the first mandrel 4 and encroaches on the serrations 42. Thereafter, a cellophane tape (not shown) is wound spirally onto the wound prepreg to tie it with pressure, and the wound prepreg is heated by a heating furnace to thereby cure the synthetic resin. Then, the mandrel 4 is drawn out from the prepreg and the cellophane tape is peeled, thereby forming the rod body 2 having locking serrations $2b$ at the inner periphery of the root end $2a$ as shown in FIG. 13.

Figure 14:
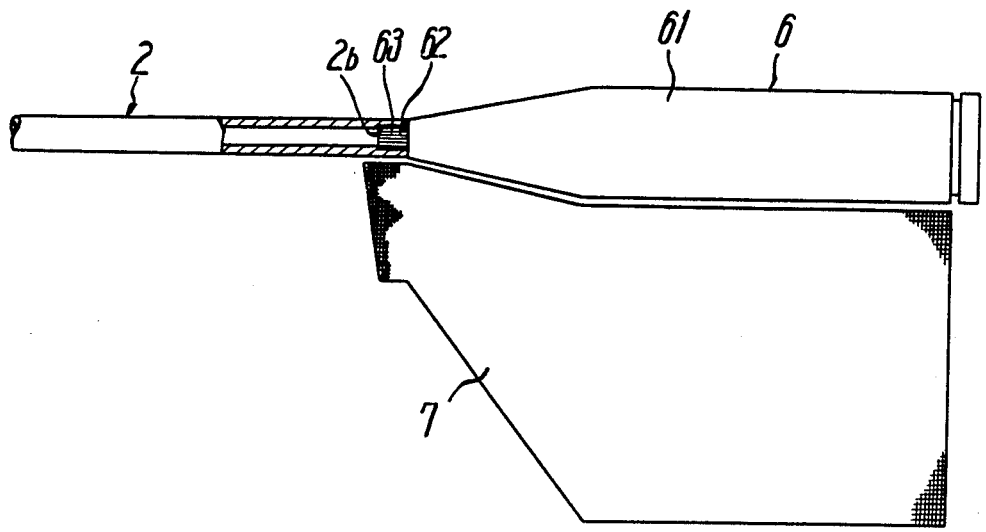
FIG. 14 is an illustration of a molding process for the tubular fitting portion.

Referring to FIG. 14, a second mandrel 6 is provided which has a mold 61 of the size corresponding to the inner periphery of tubular fitting portion 3 inclusive of a tapered portion 31 constructed the same as that in the former embodiment, a fitting member 62 smaller in an outer diameter than the root end of rod body 2 and provided at one end of mold 61, and a locking means, such as serrations 63, provided at the outer periphery of fitting member 62. The locking serrations $2b$ at the inner periphery of the root end of rod body 2 previously manufactured are fitted onto the serrations 63 at fitting member 62, in relation of being not-rotatable relative to each other. Thereafter, a second prepreg sheet 7 of high strength fibre and permeated with synthetic resin is put on the second mandrel 6 and overlaps at one end with the root end of rod body 2. Then the second prepreg sheet 7 is wound around the root end of rod body 2 and second mandrel 6 while rotating them, thereby forming a tubular fitting portion 3.

Even when a difference in outer diameter between the rod body 2 and the second mandrel 6 causes a large difference in the rotational speed during the manufacture of second prepreg 7, the rod body 2 not-rotatable relative to the second mandrel 6 allows the second prepreg 7 to be wound without causing any circumferential shift of rod body 2 with respect to the second mandrel 6, thereby preventing the second prepreg 7 from being twisted.

Figure 15:
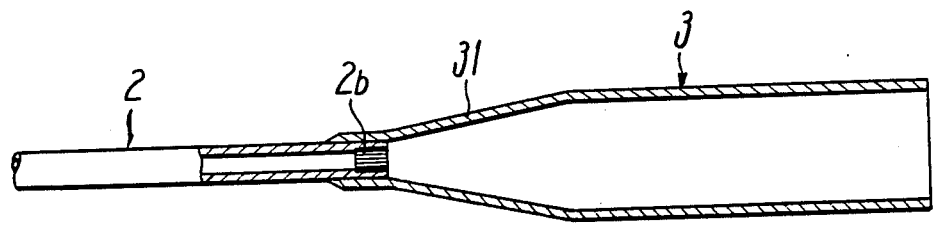
FIG. 15 is a partially omitted sectional view of the molded rod body and tubular fitting portion.

Then the second prepreg 7 after being wound is processed in the same manner as the first prepreg 5 and the second mandrel 6 is removed, thereby forming a fishing rod of rod body 2 integral with the tubular fitting portion 3 as shown in FIG. 15.

Alternatively, in this embodiment, a first mandrel having no locking means may be used to form a rod body 2 with no locking serrations $2b$ so that the rod body 2 may be fitted at the root end onto the fitting member 62 in relation of being not-rotatable relative thereto.

Also, the locking means on the fitting member 62 at the second mandrel 6 may be made square or elliptic in section instead of the use of locking serrations 63, which is not particularly defined in construction. In brief, the rod body 2 need only be not-rotatable relative to the tubular fitting portion 3.

As seen from the above embodiment, the rod body 2 previously formed is coupled with the second mandrel 6 in relation of being not-rotatable relative thereto and the second prepreg 7 is wound therearound to form the fishing rod, whereby there is no fear of twisting the prepreg 7 with respect to the rod body 2.

In the above mentioned method, a bridge member 8 may be mounted across the rod body 2 and second mandrel 6 to cover a joint a therebetween and then the second prepreg 7 may be baked under pressure.

Figure 16:
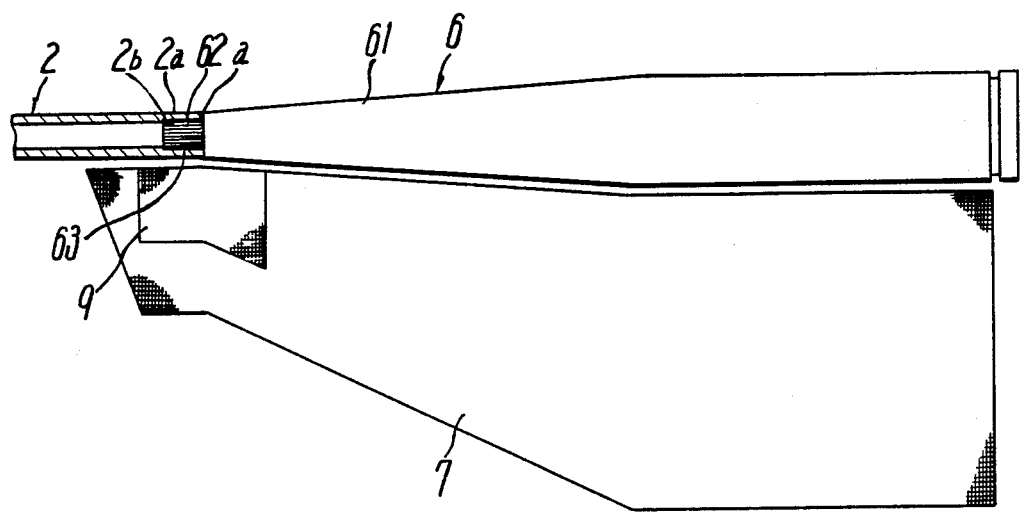
FIG. 16 is still another modified embodiment of the invention and explanatory of a molding process for a tubular fitting portion, corresponding to FIG. 14.
Figure 17:
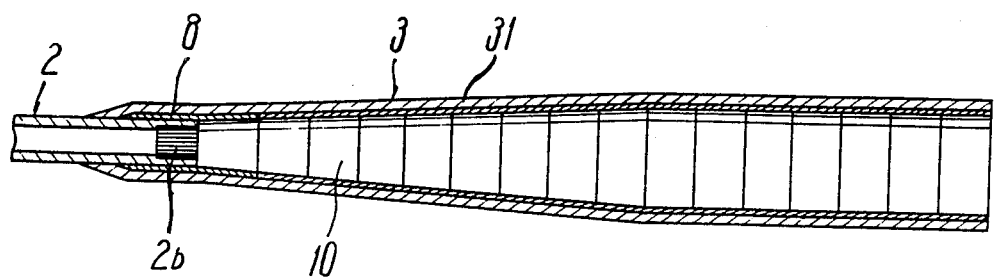
FIG. 17 is a partially omitted sectional view of the molded rod body and tubular fitting portion, corresponding to FIG. 15.

The bridge member 8, as shown in FIG. 16, is formed of a third prepreg 9 of a sheet formed mainly of boron fibre, permeated with synthetic resin, which overlaps with the inner surface of one end portion of second prepreg 7, and is applied onto the outer periphery of root end $2a$ of rod body 2 fitted to the second mandrel 6 and onto the outer periphery of the front end thereof. The other end portion of second prepreg 7 is applied onto the outer periphery of the root end of second mandrel 6. Then, the rod body 2 and second mandrel 6 are rotated simultaneously to wind thereon the third prepreg 9 and second prepreg 7, thereby covering the joint a with the third prepreg 9 as shown in FIG. 17.

In addition, on the outer periphery of second mandrel 6, except for the third prepreg winding portion, is spirally wound a strip of reinforcement tape 10 of carbon fibre permeated with synthetic resin and the second prepreg 7 is wound onto the tape 10 to form a reinforcement layer inside the tubular fitting portion 3, thereby further raising strength thereof against a crush.

Alternatively, the third prepreg 9 in the aforesaid embodiment may not overlap with the second prepreg 7, may be separate therefrom to be wound.

Also, the bridge member 8 may use a windable metal plate, a metal tube, or other tubes of reinforced resin.

Although several embodiments have been described, they are merely exemplary of the invention and not to be construed as limiting, the invention being defined solely by the appended claims.

What is claimed is:

1. A fishing rod, comprising:
   a handle having a coupling portion, a reel mounting portion and a grip, said reel mounting portion (i) being elongated, (ii) having a substantially planar reel mounting surface and (iii) comprising means for releasably mounting a fishing reel thereon,
   a rod body having a large diameter root end and a tip end and being tapered from said root end toward said tip end, said coupling portion having an outer diameter greater than said diameter of said root end, and
   a tubular fitting portion joining said rod body with said handle, said tubular fitting portion having (i) a small diameter tubular portion in continuation of said root end, (ii) a fitting portion having an inner diameter fitted onto an outer periphery of said coupling portion, and (iii) a tapered portion which is disposed between said small diameter tubular portion and said fitting portion, which increases in diameter from said small diameter tubular portion toward said fitting portion at a rate of change greater than that of said rod body and which has a length sufficient to allow stress to be dispersed therealong, said fitting portion having an edge portion shaped to enable said reel mounting portion to be exposed to an exterior, said edge portion being disposed close to said reel mounting portion, said rod body comprising a prepreg of high strength fiber permeated with synthetic resin, and said tubular fitting portion being in continuation of said rod body and formed integrally with said prepreg forming said rod body.

2. A fishing rod according to claim 11, wherein said rod body comprises a first prepreg of high strength fiber permeated with synthetic resin, and said tubular fitting portion in continuation of said rod body comprises a second prepreg separate from said first prepreg, said second prepreg overlapping with a root end of said rod body.

3. A fishing rod according to claim 2, wherein at least an outermost layer of said tubular fitting portion comprises a sheet comprising a first yarn group of high strength fibre arranged longitudinally and a second yarn group of high strength fibre arranged transversely relative to said first yarn group, said first and second yarn groups being overlapped with each other in relation of being crossed at right angles respectively and coupled with each other by use of weaving threads, said sheet being permeated with synthetic resin.

4. A fishing rod according to claim 1, wherein a connecting portion between said rod body and said tubular fitting portion is larger in thickness than said rod body, said tubular fitting portion decreasing gradually in thickness rearwardly from said connecting portion.

5. A fishing rod according to claim 1, wherein said handle is provided at a portion thereof fitted into said tubular fitting portion with a plurality of recesses.

6. A fishing rod according to claim 1, wherein said fitting portion includes a uniform diameter portion.

7. A fishing rod according to claim 1, wherein said rod body is tapered and hollow and said tapered portion has a diameter which expands at a greater rate of change than a rate of change of a diameter of said rod body, said fitting portion being in continuation of a largest diameter portion of said tapered portion.

8. A fishing rod, comprising:
   a handle having a coupling portion, a reel mounting portion at a forward side thereof, and a grip joined to said reel mounting portion and located at a rearward side of said handle, said reel mounting portion (i) being elongated, (ii) having a substantially planar reel mounting surface and (iii) comprising means for releasably mounting a fishing reel thereon;
   a rod body;
   a tubular fitting portion integrally connected with and extending from said rod body and joining said rod body with said handle, said tubular fitting portion having a tapered portion to which said rod body is integrally connected and a fitting portion which is in continuation of said tapered portion and is fitted onto and non-removably secured to an outer periphery of said coupling portion of said handle, said fitting portion having a configuration permitting said reel mounting portion of said handle to be exposed to an exterior of said rod to enable a reel to be mounted to said reel mounting surface.

9. A fishing rod as in claim 8, wherein said tapered portion increases gradually in diameter toward said handle at a change rate larger than that of said rod body.

10. A fishing rod as in claim 8, wherein said rod body comprises a prepreg of high strength fiber permeated with synthetic resin, and said tubular fitting portion is formed integrally with said prepreg forming said rod body.

11. A fishing rod according to claim 10, wherein at least the outermost layer at said tubular fitting portion comprises a sheet comprising a first yarn group of high strength fiber arranged longitudinally and a second yarn group of high strength fiber arranged transversely, said first and second yarn groups being overlapped with each other in relation of being crossed at right angles respectively and coupled with each other by use of weaving threads, said sheet being permeated with synthetic resin.

12. A fishing rod according to claim 8, wherein a connecting portion between said rod body and said tubular fitting portion is larger in thickness than said rod body, said tubular fitting portion decreasing gradually in thickness rearwardly from said connecting portion.

13. A fishing rod according to claim 8, wherein said handle is provided at a portion thereof fitted into said tubular fitting portion with a plurality of recesses.

14. A fishing rod according to claim 8, wherein said fitting portion includes a uniform diameter portion.

15. A fishing rod, comprising:
   a handle having a coupling portion at one end, an intermediate reel mounting portion and a grip, said reel mounting portion (i) being elongated, (ii) having a substantially planar reel mounting surface and (iii) comprising means for releasably mounting a fishing reel thereon,
   a rod body, and
   a tubular fitting portion joining said rod body with said coupling portion of said handle, said tubular fitting portion having a tapered portion at which said rod body is connected with said tubular fitting portion and a fitting portion which is in continuation of said tapered portion, said fitting portion having its end cut off at a substantially 90° angle relative to a longitudinal axis of said rod, and end portion of said coupling portion of said handle being fitted into said end of said fitting portion.

16. A fishing rod as in claim 15, wherein said tubular fitting portion is integrally connected with said rod body.

17. A fishing rod as in claim 16, wherein said rod body comprises a prepreg of high strength fiber permeated with synthetic resin, and said tubular fitting portion is formed integrally with said prepreg forming said rod body.

18. A fishing rod as in claim 17, wherein said rod body is tapered, said tapered portion is integrally connected to said rod body and said tapered portion increases gradually in diameter toward said handle at a change rate larger than that of said rod body.

19. A fishing rod as in claim 16, wherein at least the outermost layer at said tubular fitting portion comprises a first yarn group of high strength fiber arranged longitudinally and a second yarn group of high strength fiber arranged transversely, said first and second yarn groups being overlapped with each other in relation of being crossed at right angles respectively and coupled with each other by use of weaving threads, said sheet being permeated with synthetic resin.

20. A fishing rod as in claim 15, wherein said reel mounting portion includes a reel seat and said end portion of said reel mounting portion is disposed forwardly of said reel seat at a forward side of said handle.

* * * * *